3,493,336
MANUFACTURE OF ALKALI METAL
PHOSPHATES
Bryan Milling, Torpoint, England, assignor to Electric Reduction Company of Canada Ltd., Islington, Ontario, Canada, a company of Canada
No Drawing. Continuation of application Ser. No. 467,683, June 28, 1965. This application Sept. 4, 1968, Ser. No. 757,507
Claims priority, application Great Britain, June 18, 1964, 2,523/64
Int. Cl. C01b 25/30
U.S. Cl. 23—107                    4 Claims

ABSTRACT OF THE DISCLOSURE

The invention provides improvements in the process of producing alkali metal phosphates by the treatment of so-called wet process phosphoric acid. The improvements comprise using an iron sulphide prepared by fusing together iron and sulphur, as the reducing agent. The invention also includes the improvement in the process of treating neutralized wet process phosphoric acid with a sodium salt to precipitate sodium silicofluoride in the presence of sodium silicofluoride which previously had been added to the liquor.

---

This application is a continuation application of my copending application Ser. No. 467,683 filed June 28, 1965, now abandoned.

This invention relates to the treatment of so-called wet process phosphoric acid (hereinafter called w.p.a.) to enable it to be used to form alkali metal phosphates of good quality. W.p.a. is made by digesting phosphate rock with sulphuric acid to produce the phosphoric acid and a precipitate of gypsum which is filtered off. The w.p.a. so produced contains a great many impurities among which are fluorine and a number of cations, which latter are not all satisfactorily precipitated when the phosphoric acid in neutralised with an alkali, and these impurities will contaminate the resultant alkali metal phosphates. For example, when sodium tripolyphosphate is manufactured from wet process acid, small traces of vanadium, uranium, chromium, manganese or other metals of variable valency can give undesirable yellow, green or red colours to the finished material. The fluorine is removed in a defluorination stage as described below, after the acid leaves the gysum filter but before it is neutralised.

The invention is concerned with the treatment of the phosphoric acid to make more complete the removal of heavy metals such as vanadium, uranium, chromium and manganese upon neutralisation, and also with the removal of fluorine.

According to the invention in one aspect iron sulphide prepared by fusing together iron and sulphur is added to the phosphoric acid after it leaves the gypsum filter but before it is neutralised. The iron sulphide acts as a reducing agent. It has already been proposed to use reducing agents, including sodium sulphide, to reduce metals of variable valency in phosphoric acid but we have found that the use of the specified iron sulphide unexpectedly results in phosphates of better colour in comparison with those from acid reduced to the same degree (as measured by its Redox potential) with other reducing agents, even sodium sulphide.

The iron sulphide may be FeS, $Fe_2S_3$, or $FeS_2$, or any mixture of these obtained by fusing together iron and sulphur. The commercial grade is preferred. This commercial grade gives especially good precipitation of the above mentioned heavy metals upon neutralisation.

While the metals mentioned above will not be precipitated until neutralisation, certain other metals which may be present in the phosphoric acid, for example lead, arsenic and copper, will be precipitated as their sulphides as soon as the iron sulphide is added. However, it is not necessary to filter off this precipitate separately because when the precipitate of insoluble phosphates formed on neutralisation is filtered off it removes with it the precipitate which formed upon the addition of the iron sulphide.

The quantity of iron sulphide is not critical. It may conveniently lie between 0.05% and 0.5% by weight of the $P_2O_5$ content of the reaction mixture and is preferably about 0.15%. The exact quantity required will depend upon various factors including the amount of reducible compounds in the reaction mixture.

The addition of iron sulphide may be made at any stage between the gypsum filter and the neutralisation of the acid. Normally, after the gypsum filter, the acid is aged and then defluorinated before neutralisation. In order that any precipitate formed by the iron sulphide before neutralisation may not contaminate the sodium silicofluoride formed in the defluorination stage, we prefer to add the iron sulphide after that stage, i.e. just before neutralisation.

A further feature of the invention relates to the removal of fluorine. The fluorine in w.p.a. is normally present as fluosilicic acid, $H_2SiF_6$, and any fluorine which is not in this form can readily be converted to this form by adding silica or silicate to the acid. It is customary to remove the fluorine by adding a sodium salt such as sodium phosphate, sodium carbonate, sodium chloride or sodium sulphate which produces a precipitate of sodium fluosilicate. According to our invention this reaction is carried out in the presence of at least 5% by weight of the reaction mixture of sodium silicofluoride and the residence time of the reactants is not less than half an hour. By this means sodium fluosilicate of a better colour and a larger partical size is obtained as a by-product and the dried material flows more readily in continuous feeders such as are used for example in water works.

The proportion of fluosilicate in the reaction mixture is preferably at least 7%. The upper limit is not critical.

What is claimed is:
1. In the process of manufacturing at least one alkali metal phosphate by digesting phosphate rock with sulphuric acid to produce wet process phosphoric acid and a gypsum precipitate, filtering off said gypsum, adding a reducing agent to precipitate impurities, and then neutralising said wet process phosphoric acid to produce at least one alkali metal phosphate, the improvement comprising using an iron sulphide prepared by fusing together iron and sulphur, as said reducing agent.

2. The process of claim 1 wherein said iron sulphide is added in an amount between 0.05% and 0.5% by weight of the $P_2O_5$ content of the wet process phosphoric acid.

3. The process of claim 1 or 2 wherein said wet process phosphoric acid is defluorinated prior to the addition of said reducing agent.

4. In the process of manufacturing at least one alkali metal phosphate by digesting phosphate rock with sulphuric acid to produce wet process phosphoric acid and a gypsum precipitate, filtering off said gypsum, adding a sodium salt to the wet process phosphoric acid to precipitate sodium silicofluoride, and then neutralizing the defluorinated wet process phosphoric acid, the improvement comprising adding sodium silicofluoride in an amount at least 5% by weight of the liquor being treated before the addition of said sodium salt to precipitate sodium silicofluoride, then adding iron sulphide prepared by fusing together iron and sulphur to precipitate impurities, and then neutralising the defluorinated wet process phosphoric acid.

(References on following page)

References Cited

UNITED STATES PATENTS

| | | | |
|---|---|---|---|
| 2,028,632 | 1/1936 | Taylor | 23—107 |
| 2,585,609 | 2/1952 | Wills | 23—110 |
| 2,853,363 | 9/1958 | Sidun et al. | 23—88 |
| 2,954,275 | 9/1960 | Carothers et al. | 23—88 |
| 2,977,191 | 3/1961 | Pottiez | 23—107 |
| 3,305,305 | 2/1967 | Peterson et al. | 23—107 |

FOREIGN PATENTS 1,143,496  2/1963  Germany.

OSCAR R. VERTIZ, Primary Examiner

GREGORY A. HELLER, Assistant Examiner

U.S. Cl. X.R.

23—88, 110, 165

PO-1050
(5/69)

UNITED STATES PATENT OFFICE
CERTIFICATE OF CORRECTION

Patent No. 3,493,336         Dated February 3, 1970

Inventor(s)  BRYAN MILLING

It is certified that error appears in the above-identified patent and that said Letters Patent are hereby corrected as shown below:

Column 1, lines 9 and 10, delete "Claims priority, application Great Britain, June 18, 1964, 2,523/64".

SIGNED AND
SEALED
JUL 7 1970

(SEAL)
Attest:

Edward M. Fletcher, Jr.
Attesting Officer

WILLIAM E. SCHUYLER, JR.
Commissioner of Patents